US011919007B2

(12) United States Patent
Simons et al.

(10) Patent No.: US 11,919,007 B2
(45) Date of Patent: Mar. 5, 2024

(54) AGITATOR BALL MILL

(71) Applicant: Willy A. Bachofen AG, Muttenz (CH)

(72) Inventors: Benedikt Simons, Rastatt (DE); Guillaume Martin, Habsheim (FR)

(73) Assignee: Willy A. Bachofen AG, Muttenz (CH)

( * ) Notice: Subject to any disclaimer, the term of this patent is extended or adjusted under 35 U.S.C. 154(b) by 0 days.

(21) Appl. No.: 17/528,665

(22) Filed: Nov. 17, 2021

(65) Prior Publication Data

US 2022/0152621 A1 May 19, 2022

(30) Foreign Application Priority Data

Nov. 18, 2020 (EP) .................................... 20208296

(51) Int. Cl.
*B02C 17/16* (2006.01)
*B02C 17/04* (2006.01)
*B02C 17/18* (2006.01)
*B02C 17/24* (2006.01)

(52) U.S. Cl.
CPC ............ *B02C 17/163* (2013.01); *B02C 17/04* (2013.01); *B02C 17/1815* (2013.01)

(58) Field of Classification Search
CPC ... B02C 17/163; B02C 17/04; B02C 17/1815; B02C 17/16; B02C 17/24; B02C 17/18; B02C 19/18; B02C 19/186
See application file for complete search history.

(56) References Cited

U.S. PATENT DOCUMENTS 4,966,331 A * 10/1990 Maier ...................... B02C 17/16 366/279
5,529,251 A * 6/1996 Takami ................. F26B 11/044 241/179
2021/0213459 A1* 7/2021 Thiel ................... B02C 17/1815

FOREIGN PATENT DOCUMENTS

| | | |
|---|---|---|
| DE | 4434940 | 4/1995 |
| DE | 10064828 | 6/2002 |
| EP | 3102332 | 2/2015 |
| EP | 3618966 | 5/2019 |

(Continued)

OTHER PUBLICATIONS

English translate (JP2001180933A), retrieved date Jan. 25, 2023.*
(Continued)

*Primary Examiner* — Matthew Katcoff
*Assistant Examiner* — Mohammed S. Alawadi
(74) *Attorney, Agent, or Firm* — Weiss & Arons LLP

(57) ABSTRACT

An agitator ball mill comprising a grinding chamber having a cylindrical wall, and further having a rotatably mounted agitator shaft extending into the grinding chamber and on which at least one agitator element is arranged inside the grinding chamber. The mill further comprises an inlet for supplying to the grinding chamber material to be ground and grinding bodies, an outlet for removal of the ground material, and an induction heater for the material to be ground located in the grinding chamber, the induction heater comprising an inductor and a susceptor. The at least one agitator element comprises a susceptor material which forms the susceptor of the induction heater, wherein the inductor comprises at least one coil which is arranged outside the cylindrical wall of the grinding chamber and encompasses the grinding chamber, and wherein the cylindrical wall of the grinding chamber consists of an electrically and magnetically non-conductive material.

14 Claims, 1 Drawing Sheet

(56) References Cited

FOREIGN PATENT DOCUMENTS

| | | | |
|---|---|---|---|
| JP | 2001180933 | | 7/2001 |
| JP | 2001180933 | A * | 7/2001 |
| JP | 2009000633 | | 1/2009 |
| KR | 101822480 | | 3/2018 |
| WO | WO2019/228983 | | 12/2019 |

OTHER PUBLICATIONS

Search Report issued by the European Patent Office in European Application No. PCT/EP2019/063656 dated Aug. 21, 2019 (Appended to submitted WO2019/228983).

* cited by examiner

AGITATOR BALL MILL

CROSS REFERENCE TO OTHER APPLICATIONS

This application claims priority under 35 U.S.C. § 119 of European Patent Application No. 20208296.2, filed on Nov. 18, 2021, which is hereby incorporated by reference herein in its entirety.

FIELD OF TECHNOLOGY

The present invention relates to an agitator ball mill.

BACKGROUND OF THE DISCLOSURE

A known agitator ball mill is described, for example, in EP 3 102 332 B1. The agitator ball mill described therein comprises a substantially cylindrical grinding chamber which is bounded by a cylindrical wall and by an inlet-side end wall and an outlet-side end wall, and a rotatably mounted agitator shaft on which agitator elements, also referred to as accelerators, are arranged spaced apart from one another axially (that is to say in the direction of the longitudinal axis of the agitator shaft) inside the grinding chamber. In the vicinity of the inlet-side end wall there is arranged an inlet for supplying material to be ground and grinding bodies and in the outlet-side end wall there is provided an outlet for removal of the ground material, which outlet is separated from the grinding chamber by a separator screen that holds back the grinding bodies. During operation, the agitator shaft and thus the agitator elements that are joined thereto for conjoint rotation therewith are set in rotation by an external motor.

For many applications it is desirable or necessary that the material to be ground be heated during the grinding operation, for example in order to improve the grinding operation or to activate or support chemical reactions. Therefore, agitator ball mills having heating devices for the material to be ground have also been proposed already.

DE 100 64 828 A1 shows an agitator ball mill in which a separate heating and cooling chamber, through which a heating/cooling medium can flow, is arranged around the grinding chamber. The agitator shaft itself can also be heated or cooled.

JP 2001 180933 A shows an agitator ball mill in which a heater is arranged externally on the wall of the grinding chamber. The heater is an electrical heating ribbon which heats the wall of the grinding chamber by contact. Alternatively, instead of the heating ribbon it is possible to provide a high-frequency induction heater which likewise heats the wall of the grinding chamber.

JP 2009 000633 A discloses an agitator ball mill which has externally an electric coil around the wall of the grinding chamber. The coil generates a magnetic field which heats the wall of the grinding chamber by induction.

WO 2019/228983 A1 shows an agitator ball mill having an induction heater. In that agitator ball mill, an electric coil as inductor is arranged around the agitator shaft. In an alternative embodiment, two coils as inductors are arranged spaced apart axially on the agitator shaft. The agitator elements arranged on the agitator shaft are in the form of electrically conductive susceptors and are heated inductively by the magnetic field of the coil(s). The heat of the agitator elements is transmitted to the material to be ground, so that the material to be ground is quasi heated indirectly. All components of the induction heater are arranged in the interior of the grinding chamber of the agitator ball mill.

Indirect heating of the material to be ground by means of inductively heated agitator elements is advantageous in principle, inter alia on account of the efficiency of induction heaters. However, the arrangement described in WO 2019/228983 A1 does also have disadvantages. On one hand, in the case of agitator ball mills having a grinding chamber of small diameter, due to lack of space it is very difficult or even impossible to accommodate the relatively large inductor coils on the agitator shaft. On the other hand, in the case of agitator ball mills having a grinding chamber of relatively large diameter, the efficiency of the induction heater is reduced, firstly because the inductive heating of the agitator elements decreases as the radial distance of the agitator elements from the inductor coils increases, and secondly because during the grinding operation the material to be ground is located mainly in the peripheral regions of the grinding chamber. Irrespective of the size of the agitator ball mill, however, a further problem is the supply of electrical power to the inductor coils, which rotate together with the high-speed agitator shaft. Another difficulty is that the protection of the inductor coils from the aggressive/abrasive action of the grinding bodies is complex.

BRIEF DESCRIPTION OF THE INVENTION

Starting from that aforementioned art, the objective of the present invention is to improve an inductively heated agitator ball mill of the generic kind in such a way that the disadvantages described in connection with WO 2019/228983 A1 are avoided. In particular, an agitator ball mill having an inductive heater is to be proposed which is structurally less complex than the known agitator ball mill of this type.

That problem is solved according to the invention by an agitator ball mill as it is specified by the features of the independent claim. Further advantageous aspects are the result of the features specified in the dependent patent claims.

The agitator ball mill according to the invention has a grinding chamber having a cylindrical wall, and further has a rotatably mounted agitator shaft which extends into the grinding chamber and on which at least one agitator element is arranged inside the grinding chamber. It further has an inlet for supplying material to be ground and grinding bodies to the grinding chamber and an outlet for removal of the ground material, and has an induction heater for the material to be ground located in the grinding chamber, which induction heater comprises an inductor and a susceptor. The at least one agitator element comprises the susceptor. The inductor comprises at least one coil which is arranged outside the cylindrical wall of the grinding chamber and encompasses the grinding chamber. The cylindrical wall of the grinding chamber consists of an electrically and magnetically non-conductive material.

By virtue of the (static) arrangement of the inductor outside the grinding chamber, the inductor is protected from the effects of the material to be ground and, above all, of the grinding bodies, and it is structurally simple to supply power to the inductor. Because the cylindrical wall of the grinding chamber consists of an electrically and magnetically non-conductive material, the magnetic field generated by the inductor (that is to say by the coil) is able to pass through the cylindrical wall and act upon the susceptor material comprised by the at least one agitator element, with the result that the susceptor material and accordingly also the agitator element is heated. In particular, the agitator element as a whole can be made from the susceptor material, so that the agitator element consists of the susceptor material.

The susceptor of the induction heater consists of an electrically and/or magnetically conductive material which is heated inductively by the alternating magnetic field of the inductor (the coil) of the induction heater. Preferably the susceptor is at least electrically conductive. In such an electrically conductive susceptor, eddy currents are induced by the alternating magnetic field of the inductor then heat the susceptor (and thereby also the agitator element).

In accordance with a further aspect of the agitator ball mill according to the invention, two or more agitator elements are arranged on the agitator shaft spaced apart from one another along the agitator shaft. The inductor comprises two or more coils which are arranged along the cylindrical wall of the grinding chamber so that the magnetic fields they generate each act upon only one of the agitator elements. Preferably the two or more coils are designed to be separately controllable. As a result, (viewed in the axial direction) zonal heating of the material to be ground can be achieved, whereby the temperature can be controlled as desired during the grinding process.

In accordance with a further aspect of the agitator ball mill according to the invention, the agitator ball mill comprises a high-frequency generator for supplying the coil or coils with alternating current at an operating frequency of the high-frequency generator, the operating frequency of the high-frequency generator being in the range of 1 kHz to 1 MHz.

In accordance with a further aspect of the agitator ball mill according to the invention, the induction heater has a natural frequency, and the operating frequency of the high-frequency generator is at or close to the natural frequency of the induction heater. The efficiency of the induction heater or the energy consumption thereof is thereby optimised.

In accordance with a further aspect of the invention, the cylindrical wall of the grinding chamber is encompassed by a cooling jacket through which a cooling medium can be conducted. This allows to further support the control of the temperature of the material to be ground.

BRIEF DESCRIPTION OF THE DRAWINGS

Further advantageous aspects will become evident from the following description of illustrative embodiments of the agitator ball mill according to the invention with the aid of the drawing, in which.

DETAILED DESCRIPTION

The following observations apply in respect of the description which follows: where, for the sake of clarity of the drawings, reference signs are included in a Figure but are not mentioned in the directly associated part of the description, reference should be made to the explanation of those reference signs in the preceding or subsequent parts of the description. Conversely, to avoid overcomplication of the drawings, reference symbols that are less relevant for immediate understanding are not included in all Figures. In that case, reference should be made to the other Figures.

Figure 1:
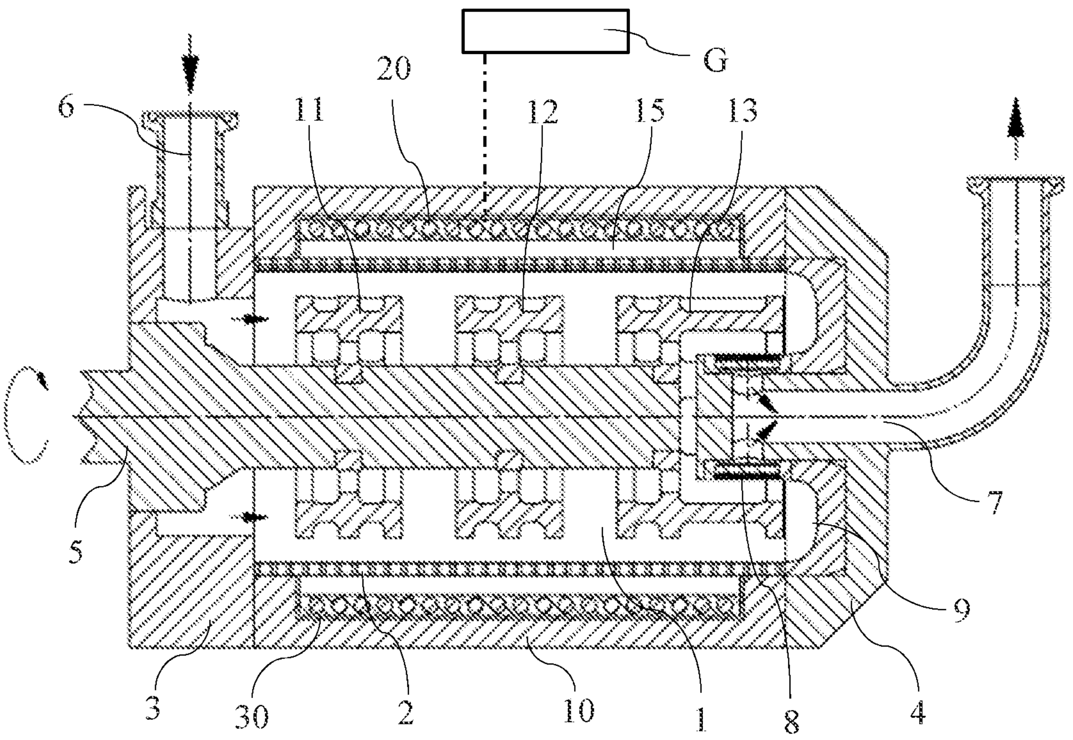
FIG. 1 shows an axial section through a first illustrative embodiment of the agitator ball mill according to the invention.

As the sectional view of FIG. 1 shows, the agitator ball mill according to the invention comprises a cylindrical grinding chamber 1 which is bounded by a cylindrical wall 2 and by an inlet-side end wall 3 and an outlet-side end wall 4. Passing through the inlet-side end wall 3 there is an agitator shaft 5 which is rotatably mounted externally or in the end wall and on which, in the illustrative embodiment shown, three agitator elements 11, 12 and 13 are arranged spaced apart from one another axially, i.e. along (that is to say in the direction of the longitudinal axis) the agitator shaft inside the grinding chamber 1. In the illustrative embodiment shown, the agitator elements 11, 12 and 13 are configured as accelerators; they are joined to the agitator shaft 5 for conjoint rotation therewith and during operation are rotationally driven by the agitator shaft 5. In the inlet-side end wall 3 there is arranged an inlet 6 for supplying material to be ground and grinding bodies to the grinding chamber 1, and in the outlet-side end wall 4 there is provided an outlet 7 for removal of the ground material, which outlet is separated from the grinding chamber 1 by a separator screen 8 that holds back the grinding bodies. In the outlet-side end wall 4 there is an annular channel 9 which is open towards the interior of the grinding chamber 1. During operation, the agitator shaft 5 and thus the agitator elements 11, 12, 13 (here: the accelerators) joined thereto for conjoint rotation therewith are set in rotation by an external motor (not shown). The agitator elements 11, 12 and 13 can be paddle-wheel-like, as shown, or, for example, be in the form of simple agitator discs.

The grinding chamber 1 is encompassed by an outer cooling jacket 10 in such a way that between the cooling jacket 10 and the cylindrical wall 2 of the grinding chamber 1 there is formed an annular hollow space 15 through which a cooling medium can be conducted as required. The supply and discharge lines for the cooling medium are not shown for the sake of clarity.

In terms of its structure and mode of operation the agitator ball mill according to the invention thus far corresponds to the aforementioned art, as represented, for example, by EP 3 102 332 B1. The person skilled in the art therefore requires no further explanation in that regard.

To heat the material to be ground, which flows through the grinding chamber 1 from inlet 6 to outlet 7 when the agitator ball mill is in operation, the agitator ball mill is equipped with an induction heater comprising a coil 20 as inductor which, during operation of the agitator ball mill, is supplied with alternating current by a high-frequency generator G (shown only symbolically in the drawing). The induction heater, in addition to comprising the inductor (coil 20), also comprises a susceptor. The coil 20 is arranged outside the grinding chamber 1 in the hollow space 15 formed between the cooling jacket 10 and the cylindrical wall 2 of the grinding chamber. The coil 20 supplied with alternating current generates an alternating (electro)magnetic field which passes through the cylindrical wall 2 of the grinding chamber 1 into the interior of the grinding chamber, because the cylindrical wall 2 of the grinding chamber 1 consists of an electrically and magnetically non-conductive material. The alternating magnetic field acts upon the agitator elements 11, 12 and 13, which are here made from a suitable electrically conductive material, for example from chromium steel or nickel-based alloys, which is also suitable for the grinding process, and generates eddy currents therein which heat the agitator elements 11, 12 and 13. The heat generated in the agitator elements 11, 12 and 13 in that way is transmitted from the agitator elements 11, 12 and 13 to the material to be ground and heats that material.

In order for the induction heating to be able to function, the cylindrical wall 2 of the grinding chamber 1 consists of a material through which the magnetic field of the coil 20 is able to pass as far as possible without hindrance. The material of the cylindrical wall 2 of the grinding chamber 1 is therefore neither electrically nor magnetically conductive, as already mentioned. A suitable material for the cylindrical wall 2 of the grinding chamber 1 is, for example, a ceramic, for example silicon carbide. As likewise mentioned, in the illustrative embodiment shown the agitator elements 11, 12 and 13 as a whole consist of an electrically conductive susceptor material in which eddy currents can be induced. The agitator elements 11, 12 and 13 can, however, alternatively consist only partly of a susceptor material or comprise such a susceptor material, in which case, however, the remainder of the agitator element consists of a material having high thermal conductivity and must likewise be suitable for the grinding process. A magnetic shield 30, which encompasses the coil 20 externally and laterally, concentrates the magnetic field generated by the coil 20 inwards onto the agitator elements 11, 12 and 13. The agitator shaft 5 can consist of an electrically and magnetically non-conductive material, so that it is itself not heated by the magnetic field of the coil 20.

Figure 2:
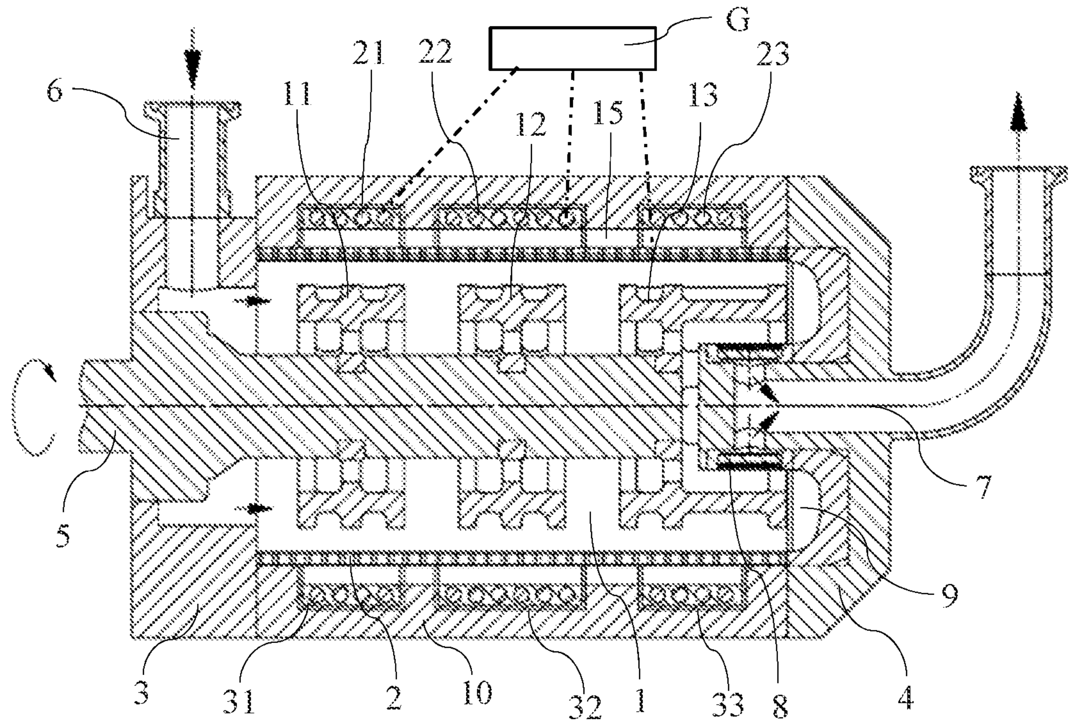
FIG. 2 shows an axial section through a second illustrative embodiment of the agitator ball mill according to the invention.

The illustrative embodiment of the agitator ball mill according to the invention shown in FIG. 2, likewise in axial section, differs from the illustrative embodiment of FIG. 1 solely in that instead of the single coil 20 extending over virtually the entire length of the grinding chamber 1 there are three axially shorter coils 21, 22 and 23 which are designed to be separately controllable and which are arranged along the grinding chamber in a manner such that they each radially encompass one of the agitator elements 11, 12 and 13. Here, the inductor is formed by the three coils 21, 22 and 23. Three magnetic shields 31, 32 and 33 concentrate the magnetic fields of the coils 21, 22 and 23 onto the agitator elements 11, 12 and 13 and shield the magnetic fields towards the outside. All other parts of the agitator ball mill are the same as in the illustrative embodiment of FIG. 1 and accordingly have the same reference signs.

The magnetic fields generated by the three coils 21, 22 and 23 each act upon only the agitator element 11 or 12 or 13 located radially opposite the respective coil. The division of the inductor into (here) three independent coils 21, 22 and 23 allows the material to be ground to be heated differently in different (axial) zones, which is advantageous for certain applications. For this reason, the coils 21, 22 and 23 are individually controllable, which can be effected either by means of three independent high-frequency generators or by means of a high-frequency generator having a plurality of outputs.

Through suitable control of the coil or coils it is possible to achieve zonal control of the temperature of the material to be ground. The control of the temperature can be additionally supported through cooling by means of a cooling medium which can be conducted through the hollow space 15.

The coil 20 or the coils 21, 22 and 23 are supplied by the high-frequency generator G shown only diagrammatically in the drawing. The operating frequency of the high-frequency generator G can be in the range of 1 kHz to 1 MHz.

The induction heater has a natural frequency which is determined by the coil or coils and the susceptors or agitator elements. Ideally, the operating frequency of the generator G for supplying the coil or coils with alternating current (which has that operating frequency) is as close as possible to or at the natural frequency of the induction heater. The optimum operating frequency can be determined empirically.

Embodiments

Embodiment 1. An agitator ball mill having a grinding chamber (1) which has a cylindrical wall (2), further having a rotatably mounted agitator shaft (5) which extends into the grinding chamber (1) and on which at least one agitator element (11, 12, 13) is arranged inside the grinding chamber (1), having an inlet (6) for supplying material to be ground and grinding bodies to the grinding chamber as well as an outlet (7) for removal of the ground material, and having an induction heater for the material to be ground located in the grinding chamber (1), the induction heater comprising an inductor and a susceptor, wherein the at least one agitator element (11, 12, 13) comprises the susceptor, wherein the inductor comprises at least one coil (20; 21, 22, 23) which is arranged outside the cylindrical wall (2) of the grinding chamber (1) and encompasses the grinding chamber (1), and wherein the cylindrical wall (2) of the grinding chamber (1) consists of an electrically and magnetically non-conductive material.

Embodiment 2. The agitator ball mill according to embodiment 1, wherein two or more agitator elements (11, 12, 13) are arranged on the agitator shaft (5) spaced apart from one another along the agitator shaft, and wherein the inductor comprises two or more coils (21, 22, 23) which are arranged along the cylindrical wall (2) of the grinding chamber (1) in a manner such that the magnetic fields they generate each act upon only one of the agitator elements (11, 12, 13).

Embodiment 3. The agitator ball mill according to embodiment 2, wherein the coils (21, 22, 23) are designed to be separately controllable.

Embodiment 4. The agitator ball mill according to any one of the preceding embodiments, which comprises a high-frequency generator (G) for supplying the coil (20) or the coils (21, 22, 23) with alternating current at an operating frequency of the high-frequency generator (G), wherein the operating frequency of the high-frequency generator is in the range of 1 kHz to 1 MHz.

Embodiment 5. The agitator ball mill according to embodiment 4, wherein the induction heater (20, 11, 12, 13; 21, 22, 23, 11, 12, 13) has a natural frequency, and wherein the operating frequency of the high-frequency generator (G) is at or close to the natural frequency of the induction heater.

Embodiment 6. The agitator ball mill according to any one of the preceding embodiments, wherein the cylindrical wall (2) of the grinding chamber (1) is encompassed by a cooling jacket (10) through which a cooling medium can be conducted.

The invention has been explained above with reference to illustrative embodiments, but is not intended to be limited to those illustrative embodiments; rather, the person skilled in the art will be able to conceive numerous modifications without departing from the teaching of the invention. For example, it is also possible for more or less than three agitator elements to be provided in the grinding chamber and the agitator elements can be configured as desired. In addition, it is also possible for the induction heater to comprise only two or more than three inductor coils. Furthermore, in the case of a plurality of coils, individual coils can also act upon two or more agitator elements simultaneously.

Thus, persons skilled in the art will appreciate that the present invention can be practiced by other than the described embodiments, which are presented for purposes of illustration rather than of limitation. The present invention is limited only by the claims that follow.

What is claimed is:

1. An agitator ball mill having:
 a grinding chamber which has a cylindrical wall;
 a rotatably mounted agitator shaft which extends into the grinding chamber and on which at least one agitator element is arranged inside the grinding chamber;
 an inlet configured to supply material to be ground and grinding bodies to the grinding chamber;
 an outlet configured to remove ground material; and
 an induction heater configured to heat the material to be ground, the induction heater comprising an inductor and a susceptor;
wherein:
 the at least one agitator element comprises the susceptor of the induction heater,
 the inductor comprises at least one coil which is arranged outside the cylindrical wall of the grinding chamber and encompasses the grinding chamber;
 the cylindrical wall of the grinding chamber consists of an electrically and magnetically non-conductive material;
 the at least one agitator element is two or more agitator elements arranged on the agitator shaft spaced apart from one another along the agitator shaft; and
 the at least one coil is two or more coils which are arranged along the cylindrical wall of the grinding chamber in a manner such that the magnetic fields they generate each acts upon only one of the two or more agitator elements.

2. The agitator ball mill of claim 1 wherein the two or more coils are designed to be separately controllable.

3. The agitator ball mill of claim 1 further comprising a high-frequency generator for supplying the two or more coils with alternating current at an operating frequency of the high-frequency generator, wherein the operating frequency of the high-frequency generator is in the range of 1 kHz to 1 MHz.

4. The agitator ball mill of claim 2 further comprising a high-frequency generator for supplying the two or more coils with alternating current at an operating frequency of the high-frequency generator, wherein the operating frequency of the high-frequency generator is in the range of 1 kHz to 1 MHz.

5. The agitator ball mill of claim 3 wherein the induction heater has a natural frequency, and wherein the operating frequency of the high-frequency generator is at or close to the natural frequency of the induction heater.

6. The agitator ball mill of claim 4 wherein the induction heater has a natural frequency, and wherein the operating frequency of the high-frequency generator is at or close to the natural frequency of the induction heater.

7. The agitator ball mill of claim 1 wherein the cylindrical wall of the grinding chamber is encompassed by a cooling jacket through which a cooling medium can be conducted.

8. The agitator ball mill of claim 2 wherein the cylindrical wall of the grinding chamber is encompassed by a cooling jacket through which a cooling medium can be conducted.

9. The agitator ball mill of claim 3 wherein the cylindrical wall of the grinding chamber is encompassed by a cooling jacket through which a cooling medium can be conducted.

10. The agitator ball mill of claim 4 wherein the cylindrical wall of the grinding chamber is encompassed by a cooling jacket through which a cooling medium can be conducted.

11. The agitator ball mill of claim 5 wherein the cylindrical wall of the grinding chamber is encompassed by a cooling jacket through which a cooling medium can be conducted.

12. The agitator ball mill of claim 6 wherein the cylindrical wall of the grinding chamber is encompassed by a cooling jacket through which a cooling medium can be conducted.

13. An agitator ball mill having:
 a grinding chamber which has a cylindrical wall;
 a rotatably mounted agitator shaft which extends into the grinding chamber and on which at least one agitator element is arranged inside the grinding chamber;
 an inlet configured to supply to the grinding chamber:
  material to be ground; and
  grinding bodies;
 an outlet configured to remove ground material; and
 an induction heater configured to heat the material to be ground, the induction heater comprising an inductor and a susceptor;
wherein:
 the at least one agitator element comprises the susceptor of the induction heater,
 the inductor comprises at least one coil which is arranged outside the cylindrical wall of the grinding chamber and encompasses the grinding chamber;
 the cylindrical wall of the grinding chamber consists of an electrically and magnetically non-conductive material;
 the at least one agitator element is two or more agitator elements arranged on the agitator shaft spaced apart from one another along the agitator shaft; and
 the at least one coil is two or more coils which are arranged along the cylindrical wall of the grinding chamber in a manner such that the magnetic fields they generate each act upon only one of the agitator elements.

14. An agitator ball mill having:
 a grinding chamber which has a cylindrical wall;
 a rotatably mounted agitator shaft which extends into the grinding chamber and on which at least one agitator element is arranged inside the grinding chamber;
 an inlet configured to supply to the grinding chamber:
  material to be ground; and
  grinding bodies;
 an outlet configured to remove ground material; and
 an induction heater configured to heat the material to be ground, the induction heater comprising an inductor and a susceptor;
wherein:
 the cylindrical wall of the grinding chamber consists of an electrically and magnetically non-conductive material;
 the at least one agitator element:
  comprises the susceptor of the induction heater, and
  is two or more agitator elements arranged on the agitator shaft spaced apart from one another along the agitator shaft; and
 the inductor comprises at least one coil which:
  is arranged outside the cylindrical wall of the grinding chamber;
  encompasses the grinding chamber; and
  is two or more coils which are arranged along the cylindrical wall of the grinding chamber in a manner such that the magnetic fields they generate each act upon only one of the agitator elements; and the coils are configured to be separately controllable.

* * * * *